April 16, 1946.    N. BELL    2,398,491

BORING HEAD

Filed Dec. 18, 1942

INVENTOR.
NICHOLAS BELL
BY
His attorney

Patented Apr. 16, 1946

2,398,491

UNITED STATES PATENT OFFICE 2,398,491

BORING HEAD

Nicholas Bell, Dearborn, Mich.

Application December 18, 1942, Serial No. 469,743

3 Claims. (Cl. 77—58)

My invention relates to a new and useful improvement in a boring head adapted for use on boring machines and the like. It is an object of the present invention to provide a boring head so arranged and constructed that the cutting or boring tool mounted thereon may be adjusted radially, thus affording a means for easily and quickly varying the diameter of cut.

It is another object of the present invention to provide a boring head having a supporting shank and provided with attachment means whereby a tool-carrying part may be mounted thereon capable of radial movement and provided with means for locking the same in its various positions of radial movement.

Another object of the invention is the provision of a boring head so constructed and arranged that an actuating mechanism for moving the supporting head radially may be easily and quickly mounted in position, secured in position and easily operated.

Other objects will appear hereafter.

It is recognized that various modifications and changes may be made in the detail of structure illustrated, without departing from the spirit of the invention, and it is intended that such variation shall be encompassed within the scope of the claims forming a part hereof.

Forming a part of this specification is a drawing in which

Figure 1:
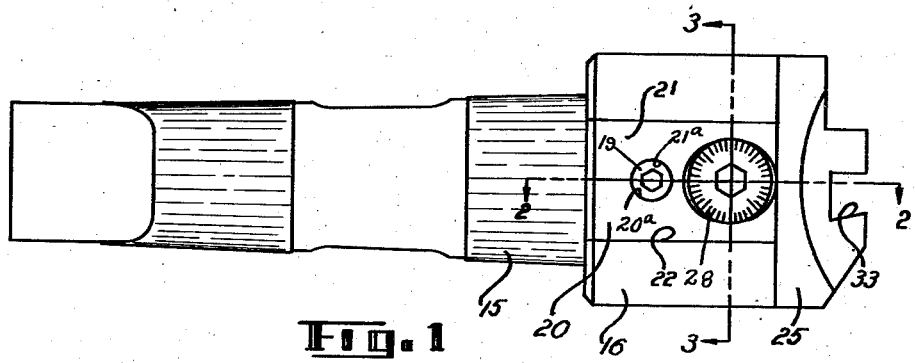
Fig. 1 is an elevational view of the invention.
Figure 2:
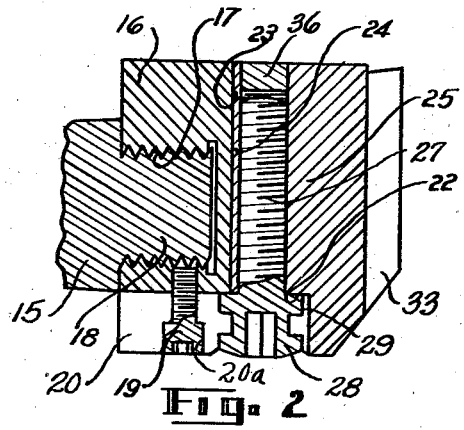
Fig. 2 is a sectional view taken on line 2—2 of Fig. 1.
Figure 3:
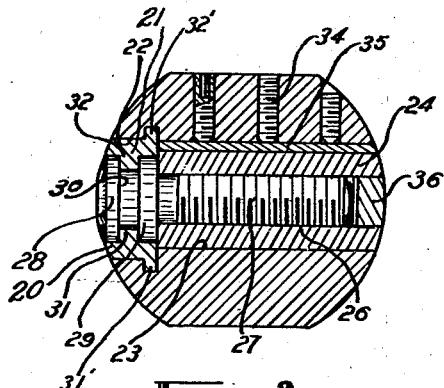
Fig. 3 is a sectional view taken on line 3—3 of Fig. 1.
Figure 4:
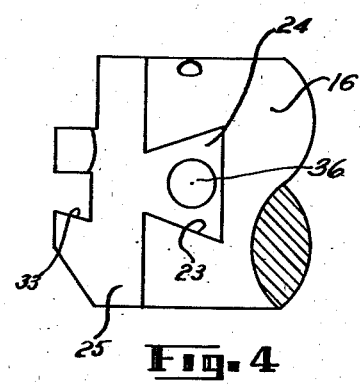
Fig. 4 is a fragmentary side elevational view from a position different than that of Fig. 1.
Figure 5:
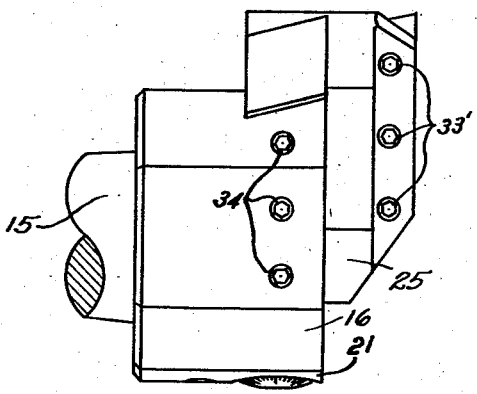
Fig. 5 is a fragmentary side elevational view of the invention from another direction.

I have illustrated the invention used on a structure embodying a shank 15, which is adapted to slip into a tapered socket of a rotating or driving part. A head 16 is provided with an internally threaded socket 17, which is adapted to thread upon the reduced threaded portion 18 of the shank 15. A pair of retaining plates 20 and 21 are mounted in the recess 22 formed in the head 16. Extended diametrically through the head 16 is a dove-tailed slot 23, in which engages the dove-tailed rib 24 as clearly shown in Fig. 4. This dove-tailed rib 24 extends rearwardly of the tool retainer 25. Formed through the rib 24 is a threaded passage 26 in which is threaded the stud 27, having a head embodying the spaced apart flanges 28 and 29 to provide the intermediate channel or groove 30, in which engage the inwardly projecting flanges or ribs 31 and 32, formed on the plates 20 and 21 respectively. A plug 36 serves to close one end of the passage 26. As shown in Fig. 3 each of the plates 20 and 21 is provided with the outwardly extended flange 31' and 32' respectively, which engage in a groove formed in the head 16. These plates 20 and 21 are provided around the channel 30 with an opening sufficiently large to permit an embracing of the stud at this point. The plates 20 and 21 are assembled about the upper portion of the stud 26 with the flanges 31 and 32 engaging in the groove 30. When so positioned the plates are slid inwardly from the end of the head 16 the flanges 31 prime and 32 prime riding in the grooves formed in the head 16 as clearly shown in Fig. 3. The stud will then lie in the dove-tailed slot 23. The rib 24 is then brought into such a position that it will register with the slot 23 and the threaded passage 26 will register with the stud 27. By rotating the stud 27 the dove-tailed rib 24 may then be drawn diametrically of the head 16 so as to ride in the dove-tailed groove or slot 23. Formed in the end face of the retaining plate or disc 25 is the blade receiving slot 33 in which a suitable blade is clamped in position by means of the set screws 33'.

Formed in the plates 20 and 21 are registering recesses 20a and 21a which form an opening through which is projected a set screw 19 which is threaded into the head 16 and serves to lock the head 16 on the shank portion 18 and also to lock the plates 20 and 21 in fixed relation to the head 16 and the shank portion 18. In use when the blade is mounted in the slot 33 the retainer 25 may be moved radially upon a rotation of the stud 27. When the retainer 25 is moved to the desired position it may be locked in position by means of the set screws 34, which bear against the loose wear plate 35 which serves to clamp the rib 24 immovably in the slot 23. As shown in the drawing, graduations are mounted on the outer face of the stud head so that the device may be graduated to determine the amount of radial movement in proportion to the rotative movement of the stud 27, thus affording means for accurate adjustment of the cutting tool to various diameters of cut. In this way I have provided a simple and inexpensive structure which may be easily and quickly adjusted to its various positions of use, and which may be easily assembled from a minimum number of parts, while still retaining a durable structure.

What I claim as new is:

1. A tool of the class described, comprising: a supporting head having a dove-tailed diametrically extending groove formed in its forward face and provided on one side with an axially extending peripheral recess opening into said groove and extending upon opposite sides thereof; a cutting tool retainer; a diametrically extending rib on the rear face of said retainer slidably engaging in the groove in said head and having an internally threaded passage extending longitudinally therethrough; a stud threaded into said passage; a head on one end of said stud and having a peripheral groove formed therein; a pair of elongated, axially directed retaining plates positioned in said recess and embracing said head, each of said plates having a flange entering said peripheral groove for retaining said stud in fixed axial relation to said supporting head.

2. A tool of the class described, comprising: a supporting head having a dove-tailed diametrically extending groove formed in its forward face and provided on one side with an axially extending peripheral recess opening into said groove and extending upon opposite sides thereof; a cutting tool retainer; a diametrically extending rib on the rear face of said retainer slidably engaging in the groove in said head and having an internally threaded passage extending longitudinally therethrough; a stud threaded into said passage; a head on one end of said stud and having a peripheral groove formed therein; a pair of elongated, axially directed retaining plates positioned in said recess and embracing said head, each of said plates having a flange entering said peripheral groove for retaining said stud in fixed axial relation to said supporting head; and means for retaining said plates in fixed relation to said supporting head radially thereof.

3. A tool of the class described, comprising: a supporting head having a dove-tailed diametrically extending groove formed in its forward face and provided on one side with an axially extending peripheral recess opening into said groove and extending upon opposite sides thereof; a cutting tool retainer; a diametrically extending rib on the rear face of said retainer slidably engaging in the groove in said head and having an internally threaded passage extending longitudinally therethrough; a stud threaded into said passage; a head on one end of said stud and having a peripheral groove formed therein; a pair of retaining elongated, axially directed plates positioned in said recess and embracing said head, each of said plates having a flange entering said peripheral groove for retaining said stud in fixed axial relation to said supporting head; means on said plates cooperating with said head for preventing radial movement of said plates relatively to said supporting head; and a supporting shank relative to which said head may be mounted in fixed relation.

NICHOLAS BELL.